US008423391B2

(12) United States Patent
Hessedenz

(10) Patent No.: US 8,423,391 B2
(45) Date of Patent: *Apr. 16, 2013

(54) SYSTEMS AND METHODS FOR AUTOMATED PARALLELIZATION OF TRANSPORT LOAD BUILDER

(75) Inventor: Hans-Juergen Hessedenz, Saarwellingen (DE)

(73) Assignee: SAP AG, Walldorf (DE)

( * ) Notice: Subject to any disclaimer, the term of this patent is extended or adjusted under 35 U.S.C. 154(b) by 1988 days.

This patent is subject to a terminal disclaimer.

(21) Appl. No.: 11/191,026

(22) Filed: Jul. 28, 2005

(65) Prior Publication Data

US 2007/0027573 A1 Feb. 1, 2007

(51) Int. Cl.
*G06Q 10/00* (2012.01)

(52) U.S. Cl.
USPC .......................... 705/7.12; 705/7.11; 705/28

(58) Field of Classification Search ................ 705/7.11, 705/7.12, 28; 709/102, 100, 202; 701/201
See application file for complete search history.

(56) References Cited

U.S. PATENT DOCUMENTS

| 5,797,113 | A  | * | 8/1998  | Kambe et al. .................. 701/201 |
| 6,529,934 | B1 | * | 3/2003  | Kawamura et al. ............. 718/102 |
| 6,801,901 | B1 | * | 10/2004 | Ng ................................. 705/28 |
| 6,889,197 | B2 | * | 5/2005  | Lidow ............................. 705/10 |
| 7,243,074 | B1 | * | 7/2007  | Pennisi, Jr. ...................... 705/8 |
| 7,430,610 | B2 | * | 9/2008  | Pace et al. ..................... 709/233 |
| 2002/0019759 | A1 | * | 2/2002 | Arunapuram et al. ............ 705/7 |
| 2004/0172344 | A1 | * | 9/2004 | Stockwell et al. ............... 705/28 |
| 2006/0059005 | A1 | * | 3/2006 | Horn et al. ........................ 705/1 |
| 2006/0059059 | A1 | * | 3/2006 | Horn et al. ...................... 705/35 |
| 2006/0059060 | A1 | * | 3/2006 | Horn et al. ...................... 705/35 |

FOREIGN PATENT DOCUMENTS

WO     WO 00/68859      *  5/2000

OTHER PUBLICATIONS

User's Guide to ROADNET 5000. Routing & Scheduling System, Version 5.6 United Parcel Service Company, Roadnet Technologies, Inc. 1996, Timonium, MD.*
SCM APO 4.0 Training Course in Supply Network Planning. Unit 10: Transport Load Builder. IBM Corporation 2005.*
Cheung, Raymond K; Muralidharan, B. "Dynamic Routing for Priority Shipments in LTL Service Networks", Feb. 2000, Transportation Science, 34:1, ABI/INFORM Global, p. 86.*
Kleywegt, Anton Jan. "Dynamic and Stochastic Models with Freight Distribution Applications". PhD Purdue University, 1996, 222 pp., AAT 9713537.*

(Continued)

*Primary Examiner* — Jonathan G Sterrett
*Assistant Examiner* — Stephanie Zagarella
(74) *Attorney, Agent, or Firm* — Finnegan, Henderson, Farabow, Garrett & Dunner LLP

(57) ABSTRACT

Systems and methods are provided for creating a transport load for one or more stock transfers. In one exemplary embodiment, the systems and methods may include providing a parallel processing profile to be associated with the distribution plan. The method may also include building one or more packages of one or more transportation lanes, wherein building one or more packages comprises providing a lanes table of the one or more transportation lanes. The lanes table may comprise information associated with each of the one or more transportation lanes. The method may further include selecting the one or more transportation lanes for each package based on the information and the parallel processing profile, and generating the transport load for each package.

45 Claims, 16 Drawing Sheets

OTHER PUBLICATIONS

Muralidharan B. "Dynamic Routing and Service Network Design for Less-than-truckload (LTL) Motor Carriers" 1997, Iowa State University, Ames, Iowa, PhD Dissertation, pp. 1-94.*

Rodrigue, Jean-Paul. "Parallel Distribution Processing of Transportation/Land Use Systems: Theory and Modelling with Neural Networks" Transportation Research C, 1997, vol. 5, pp. 259-271.*

* cited by examiner

940

| Transportation Lane | |
|---|---|
| L1 -> L3 | ~ 942 |
| L1 -> L4 | ~ 944 |
| L2 -> L4 | ~ 946 |
| L2 -> L5 | ~ 948 |
| L3 -> L6 | ~ 950 |
| L4 -> L6 | ~ 952 |
| L5 -> L7 | ~ 954 |
| L6 -> L8 | ~ 956 |
| L7 -> L9 | ~ 958 |

| Sequence Number | Transportation Lane | |
|---|---|---|
| 1 | L1 -> L3 | ~ 942 |
| 1 | L1 -> L4 | ~ 944 |
| 1 | L2 -> L4 | ~ 946 |
| 1 | L2 -> L5 | ~ 948 |
| 2 | L3 -> L6 | ~ 950 |
| 2 | L4 -> L6 | ~ 952 |
| 2 | L5 -> L7 | ~ 954 |
| 3 | L6 -> L8 | ~ 956 |
| 3 | L7 -> L9 | ~ 958 |

FIG. 9D

SYSTEMS AND METHODS FOR AUTOMATED PARALLELIZATION OF TRANSPORT LOAD BUILDER

BACKGROUND OF THE INVENTION

I. Field of the Invention

The present invention generally relates to the field of data processing and to computerized systems and methods for supply chain management. More particularly, the invention relates to computerized systems and methods for automated parallelization of a transport load builder in a supply chain environment.

II. Background Information

In a supply chain management (SCM) environment, Supply Network Planning (SNP) typically integrates the purchasing, manufacturing, distribution, and transportation of products so that comprehensive tactical planning and sourcing decisions can be simulated and implemented on the basis of a single, global consistent model. SNP, which may be implemented using software or computerized applications, uses advanced optimization techniques, based on constraints and penalties, to plan product flow along the supply chain. The result is optimal purchasing, production, and distribution decisions, reduced-order fulfillment times and inventory levels, and improved customer service.

Starting from a demand plan, SNP determines a permissible short-to medium-term plan for fulfilling the estimated sales volumes. This plan covers both the quantities that must be transported between locations (for example, a distribution center to a customer or a production plant to a distribution center), and the quantities to be produced and procured. When making a recommendation, SNP may compare all logistical activities to the available capacity.

Within SNP, a transport load builder (TLB) application is often provided that groups transport loads for various means of transport while ensuring that the capacity of the means of transport is utilized as much as possible. A TLB may group deployment stock transfers or replenishment orders that were generated for individual products in previous planning runs into TLB shipments for several products. A TLB application may create a transport load for one or more products from a source location to a destination location.

Currently, technology is available to help create transport loads for products within a supply chain environment. However, existing TLB applications suffer from several drawbacks. One problem is that conventional TLB applications only create one transport load at a time for a single transportation lane. As a result, a TLB application may have to run several times in order to create several transport loads. This can lead to very long processing or run times as the transport loads are created successively.

Furthermore, in some existing TLB applications, a user may manually group the transportation lanes into various packages and then start a TLB process for each of the packages at the same time. However, this often leads to severe errors in distribution. For example, if two TLB processes were started for two packages, and each package contained the same transportation lane, a lockup would occur with the processes if the quantity of the transportation lanes in the packages exceeded the available quantity of the transportation lanes.

Accordingly, there is a need for improved systems and methods for automatically and more efficiently processing TLB runs, such as TLB runs in a supply chain environment.

SUMMARY OF THE INVENTION

Methods, systems, and articles of manufacture consistent with the present invention may create a transport load for one or more stock transfers. More particularly, methods, systems, and articles of manufacture consistent with the invention facilitate the automated parallelization of the creation of the transport loads of one or more stock transfers in a transport load application, for example, in a supply chain management system.

One exemplary embodiment of the invention relates to a method for creating a transport load for one or more stock transfers. The method may comprise providing a parallel processing profile to be associated with the distribution plan, and building one or more packages of one or more transportation lanes. Building the one or more packages may comprise providing a table of the one or more transportation lanes, the table comprising information associated with each of the one or more transportation lanes, and selecting the one or more transportation lanes for each package based on the information and the parallel processing profile. The method may further comprise generating the transport load for each package.

Another exemplary embodiment of the invention relates to a load system. The system may include a processor and a memory configured to perform a method for creating a transport load for one or more stock transfers. The method may comprise providing a parallel processing profile to be associated with the distribution plan and building one or more packages of one or more transportation lanes, wherein building one or more packages comprises providing a lanes table of the one or more transportation lanes. The lanes table may information associated with each of the one or more transportation lanes. The method may further comprise selecting the one or more transportation lanes for each package based on the information and the parallel processing profile, and generating the transport load for each package.

Another exemplary embodiment of the invention relates to a computer-readable medium which stores a set of instructions which when executed performs a method for creating a transport load for one or more stock transfers. The method may comprise providing a parallel processing profile to be associated with the distribution plan, and building one or more packages of one or more transportation lanes, wherein building one or more packages comprises providing a lanes table of the one or more transportation lanes. The lanes table may comprise information associated with each of the one or more transportation lanes. The method may further comprise selecting the one or more transportation lanes for each package based on the information and the parallel processing profile, generating the transport load for each package.

Additional aspects of the invention are set forth in the detailed description that follows or may be learned by practice of methods, systems, and articles of manufacture consistent with the present invention. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several aspects of the invention and, together with the description, serve to explain the principles of the invention. In the drawings:

FIGS. 9A-9D are block diagrams and flowcharts of an exemplary method for determining a sequence number for transportation lanes, consistent with an embodiment of the present invention;

DETAILED DESCRIPTION

Figure 1:
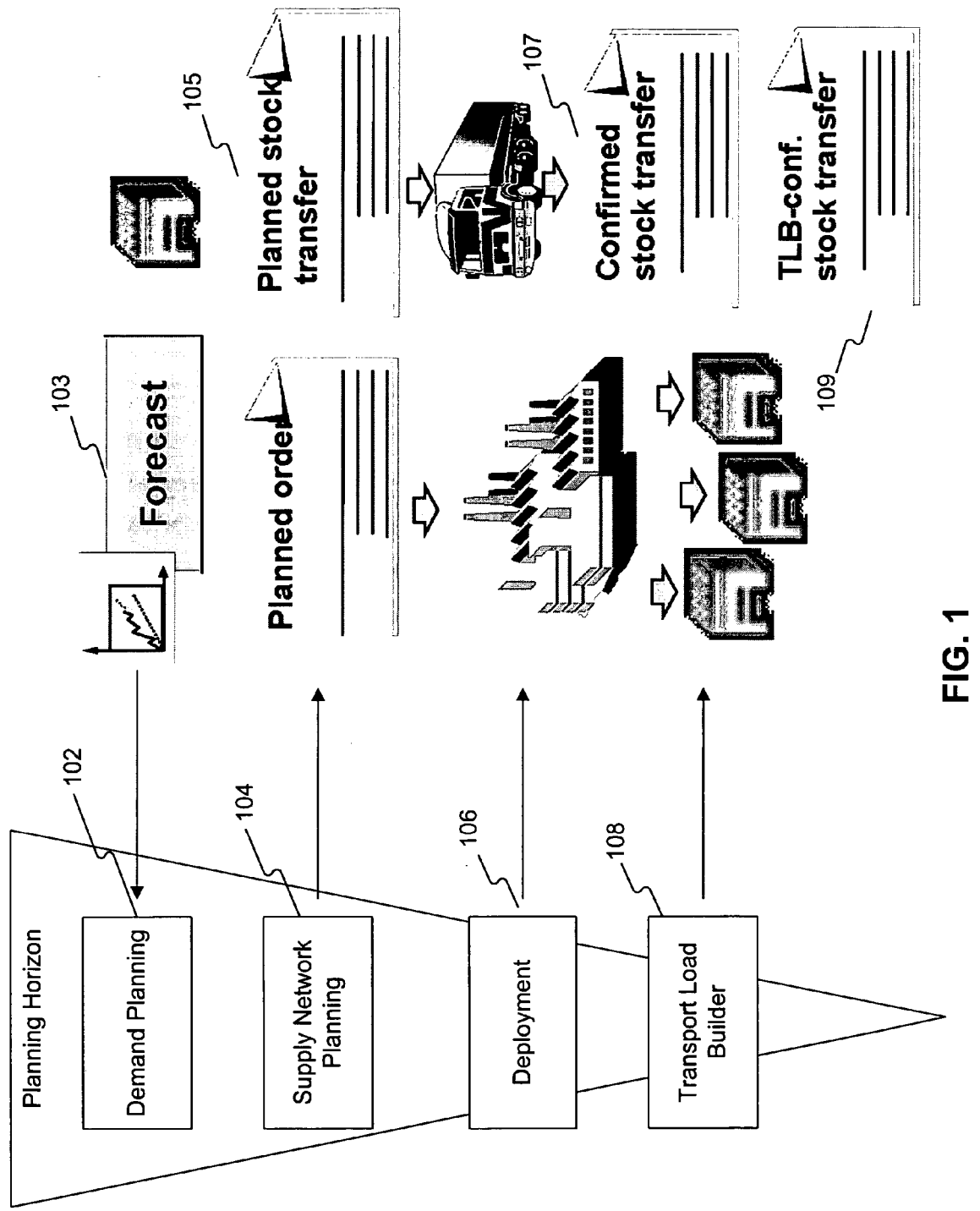
FIG. 1 illustrates an exemplary environment for implementing embodiments of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

FIG. 1 illustrates an exemplary environment for implementing embodiments consistent with the present invention. In the example of FIG. 1, an SCM environment is presented. An initial step in an SCM environment may be Demand Planning 102 for a given planning horizon (e.g., one or more months). In Demand Planning 102, a system may data mine historical data to forecast 103 future demand of products by customers. Once the Demand Planning 102 has occurred, SNP 104 may occur. SNP 104 integrates purchasing, manufacturing, distribution, and transportation so that comprehensive planning and sourcing decisions can be simulated and implemented on the basis of a single model. SNP 104 may use optimization techniques to plan product flow along the supply chain. For example, starting with the demand plan received from Demand Planning 102, SNP 104 may determine a short- to medium-term plan for fulfilling the estimated sales volumes and create planned stock transfer orders 105. This plan may cover both the quantities that must be transported between locations and the quantities to be produced and/or procured.

Deployment 106 may then determine how and when a product should be deployed to distribution centers. As will be appreciated by those skilled in the art, embodiments of the present invention are not limited to distribution centers, but will be referred to only for illustrating exemplary embodiments consistent with the present invention. Inventory may also be deployed to customers and/or vendor-managed inventory accounts. Deployment 106 may include using a module or system to produce plans based on constraints (such as transportation capacities) and business rules (such as minimum cost approach or replenishment strategies).

Deployment 106 may generate stock transfer orders 107 that serve as a basis for a TLB 108. TLB 108 may group transport loads for various means of transport. The various means of transport may include a truck, a ship, a train, an automobile or any other means of transport the a user has defined. By way of example, TLB 108 may group deployment stock transfers that were generated by deployment 106 into TLB-confirmed stock transfers 109, which are then sent to a warehouse or elsewhere for processing. Implementations for TLB 108 are discussed further below with reference to, for example, FIGS. 2-11.

As used herein, the term "TLB" refers to a grouping process that determines how to group transport loads for various means of transport. If the produced quantities for the transport loads match the quantities planned prior to TLB in SNP planning, the result of the TLB is a confirmation of the SNP plan. If the available quantities are not sufficient to fulfill the demand, or if these quantities exceed the demand, the system may make appropriate changes. As represented in FIG. 1, TLB generates transport loads from the deployment stock transfers created in a deployment application.

Embodiments of the invention may be implemented for determining the grouping of stock transfers, where the stock may be products, materials, parts, and the like.

For purposes of illustration, embodiments of the invention are described herein with reference to a transportation lane. The term "transportation lane," as used herein, refers to a transportation route between two locations in a supply chain. It is defined by a source and destination location and also the means of transport. A transportation lane may include one or more attributes, such as a source location, a destination location, and a sequence number. As used herein, a "product" refers to goods that are the subject of a business activity. A product may be used, consumed, or created in the course of a product process and may be finished goods, stock parts, or material used in the production cycle. A sequence number is determined for each transportation lane and may represent a priority for each transportation lane so that the transportation lanes are processed in an order where no lockups occur. The determination of the sequence number is discussed below with regard to FIGS. 9A-9D.

Figure 2:
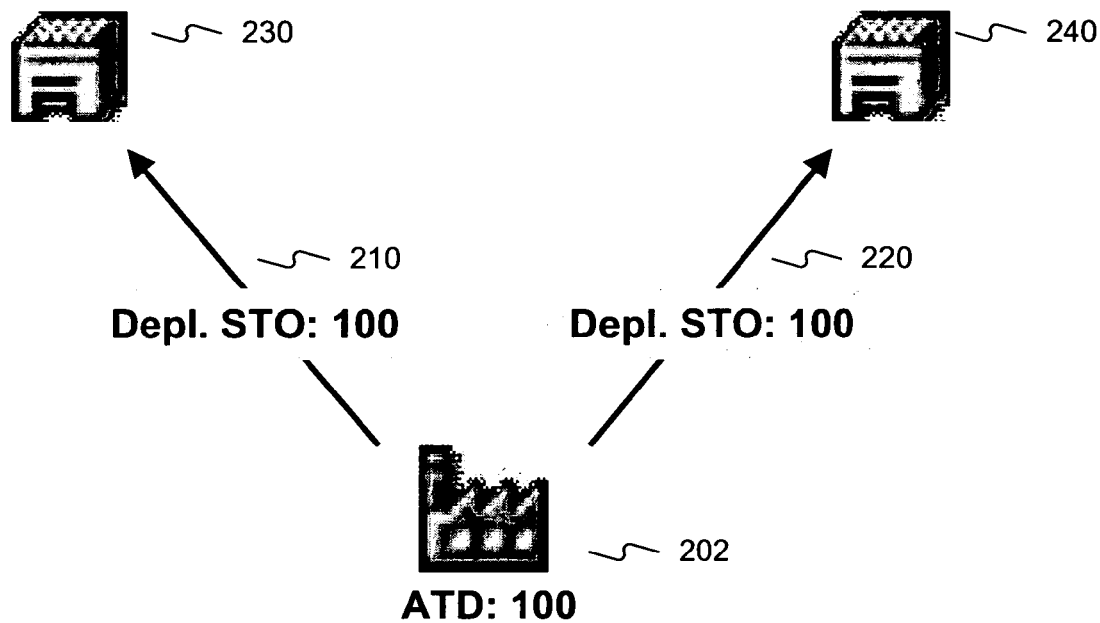
FIG. 2 illustrates an exemplary block diagram for determining the available deploy quantity before building transport loads.

For purposes of illustration, FIG. 2 provides an exemplary block diagram and table related to a TLB process; in this case, determining the available deploy quantity before grouping transport loads. Before TLB is carried out for a transportation lane, the available to deploy (ATD) quantity of location products may be determined. In a supply chain, the flow of material may normally be from a plant to a distribution center and then from the distribution center to one or more customer locations. Thus, TLB may have to be carried out in a correct sequence, so that stock transfer orders with a location product are already confirmed as being available, before deployment is started for the location product, and then TLB is started using the transportation lanes to group the stock transfers from deployment.

In the example shown in FIG. 2, for a plant 202, a quantity of "100" units is available. There may exist two transportation lanes 210 and 220 for two distribution centers 230 and 240 and each distribution center 230 and 240 may have a demand of 100 units. If TLB was started using both transportation lanes in parallel, the availability check would potentially calculate an available quantity of 100 for both processes, with the demands on both destination locations being confirmed, and the source location resulting in a shortage of 100. Therefore, all transportation lanes with the same source location should be planned within the same process, as will be described below.

Figure 3:
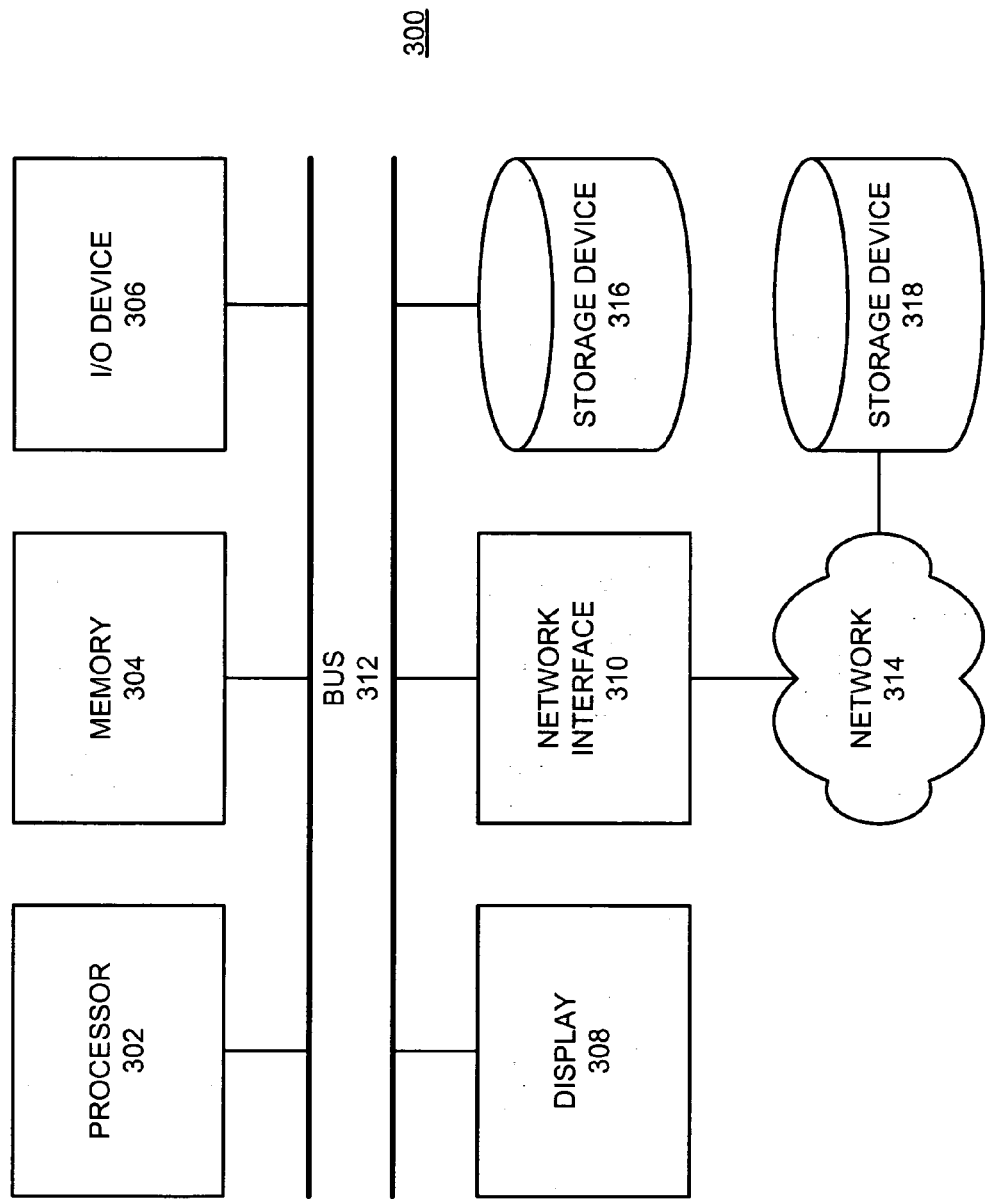
FIG. 3 illustrates an exemplary SNP system, consistent with an embodiment of the present invention.

In one exemplary embodiment consistent with the present invention, purchasing, manufacturing, distribution, and transportation in a supply chain may be monitored and controlled using an SNP system, such as the exemplary SNP system 300 illustrated in FIG. 3. SNP system 300 may include a processor 302, a memory 304, an input/output (I/O) device 306, a display 308, a network interface 310, a bus 312, a network 314, and one or more persistent storage devices 316 and 318. Processor 302, memory 304, I/O device 306, display 308, network interface 310, and storage device 316 may be configured to communicate over bus 312. Storage device 316 and network interface 310 may be configured to communicate over network 314. In one exemplary embodiment, SNP system 300 or components thereof may be incorporated into a planning system, such as the Advanced Planning Optimizer (APO) available from SAP AG (Walldorf, Germany).

In the example of FIG. 3, processor 302 may include a mainframe, a laptop, a personal computer, a workstation, a computer chip, a digital signal processor board, an analog computer, a plurality of processors, or any other information processing device or combination of devices. Further, processor 302 may be implemented by a general purpose computer or data processor selectively activated or reconfigured by a stored computer program, or may be a specially constructed computing platform for carrying out the features and operations disclosed herein. Memory 304 may include random access memory (RAM), read-only memory (ROM), flash memory, or any other information storage device. I/O device 306 may include a keyboard, a mouse, a trackball, a light pen, an electronic tablet, or any other mechanism to communicate input or output data with SNP system 300. Display 308 may include a cathode-ray-tube monitor, a plasma screen, a liquid-crystal-display screen, or any other device to display or otherwise convey information from SNP system 300.

Network interface 310 may include an Ethernet card, an FDDI card, a modem, or any other mechanism for interfacing to a network. Bus 312 may include a data cable, a circuit board connection, a fiber optic line, a network, a serial connection, a parallel connection, or any other mechanism for conveying information between processor 302, memory 304, I/O device 306, display 308, network interface 310, and/or storage device 316. Network 314 may include a local area network (LAN), a wide area network (WAN), an Intranet, an Extranet, the Internet, a telephone network, a wireless network, a wired network, and/or any other means for communicating between locations.

Storage devices 316 and 318 may include a hard drive, a tape drive, a RAID disk array, a database system, an optical disk drive, and/or any other device or system that persistently stores information. A database in storage devices 316 and 318 may store various types of data, including enterprise-wide data, such as master data and transactional data. As disclosed herein, data stored in a database may represent objects and may be used during processing. Master data may include, for example, data pertaining to product, location, location product, transportation lane, etc. Transactional data may include, for example, data pertaining to inventory, orders (including stock or product transfer orders), sales, etc. The above-noted items are merely examples and, as will be appreciated by those skilled in the art, other types of data may be stored in the database according to the needs of the user and/or the SNP system.

In one exemplary embodiment consistent with the present invention, memory 304 may store one or more software applications or modules that provide one or more TLB processes that may be executed in parallel to automatically group transport loads for certain means of transport in a supply chain environment. Memory 304 may also include a package-building process that is adapted to use the transportation lanes to group transport loads into data packages, that is, lane data, processed by the parallel TLB processes.

Figure 4:
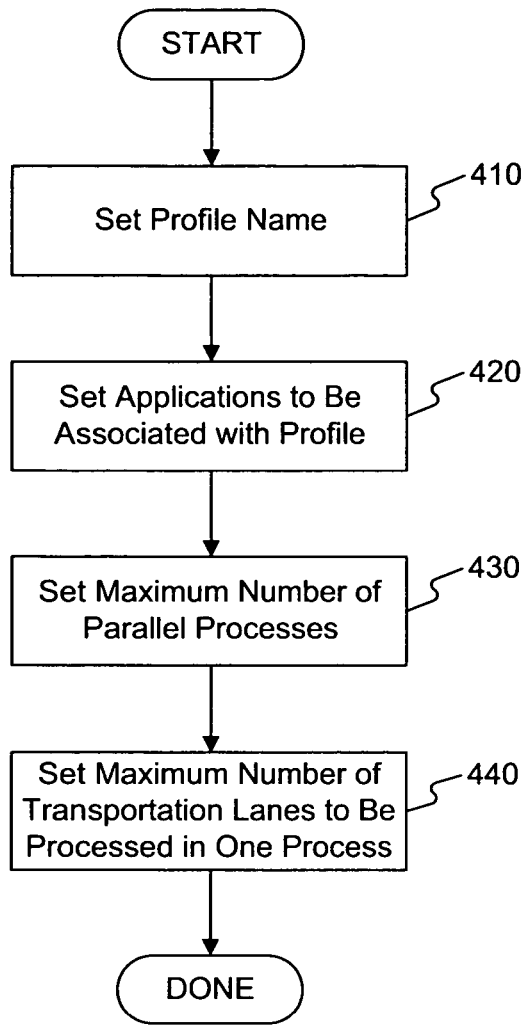
FIG. 4 is a flowchart of an exemplary method for creating a parallel processing profile, consistent with an embodiment of the present invention.

FIG. 4 is a flowchart of an exemplary method for creating a parallel processing profile (PPP), consistent with an embodiment of the present invention. For purposes of illustration, the flowchart of FIG. 4 is described with reference to the exemplary SNP system 300, as depicted in FIG. 3. It will be appreciated, however, by those skilled in the art that the method of FIG. 4 is not limited to use with SNP system 300 and may be used in other planning environments, consistent with the present invention.

A user may first designate a profile name to be associated with the PPP (stage 410). This may be achieved through a GUI (see, e.g., FIG. 5) or other input means. Once the user has designated a profile name, the user may then set the application(s) to be associated with the profile (stage 420). For example, a user may associate a profile with a TLB application or other application(s). The user may then determine the number of parallel TLB processes to be associated with the profile (stage 430). In one embodiment, this number represents the number of TLB processes that may be executed at the same time by SNP system 300. As will be appreciated by those skilled in the art, use of the PPP is not limited to TLB processes, but will be referred to only for illustrating exemplary embodiments consistent with the present invention. The PPP, for example, can also be used for other processes within the SNP system 300.

Once the maximum number of parallel processes has been defined, the user may then set the maximum number of transportation lanes to be processed in one process, i.e., the package size (stage 440). In one embodiment, SNP system 300 may group stock transfers into transport loads for various means of transport using the maximum number of parallel processes (defined in stage 430) and the package size (defined in stage 440). The profile may then be saved, such as in storage device 316 (cf. FIG. 3).

To create a PPP, one or more user interfaces may be provided. Such an interface may include, for example, entry fields and control buttons for entering information. In one embodiment, a GUI is provided with message prompts, entry fields, and/or control buttons to facilitate the creation of planning PPPs by a user. Such a GUI may comprise one or more screens or windows to guide a user through the process of creating a PPP. Help screens may provide information for the user, and/or drop-down menus or tables may provide lists of predefined services, profiles, or other elements for selection by the user when creating a PPP. Additionally, or alternatively, PPPs may be created using a separate application or program and then stored for later access by the SNP system 300.

Figure 5:
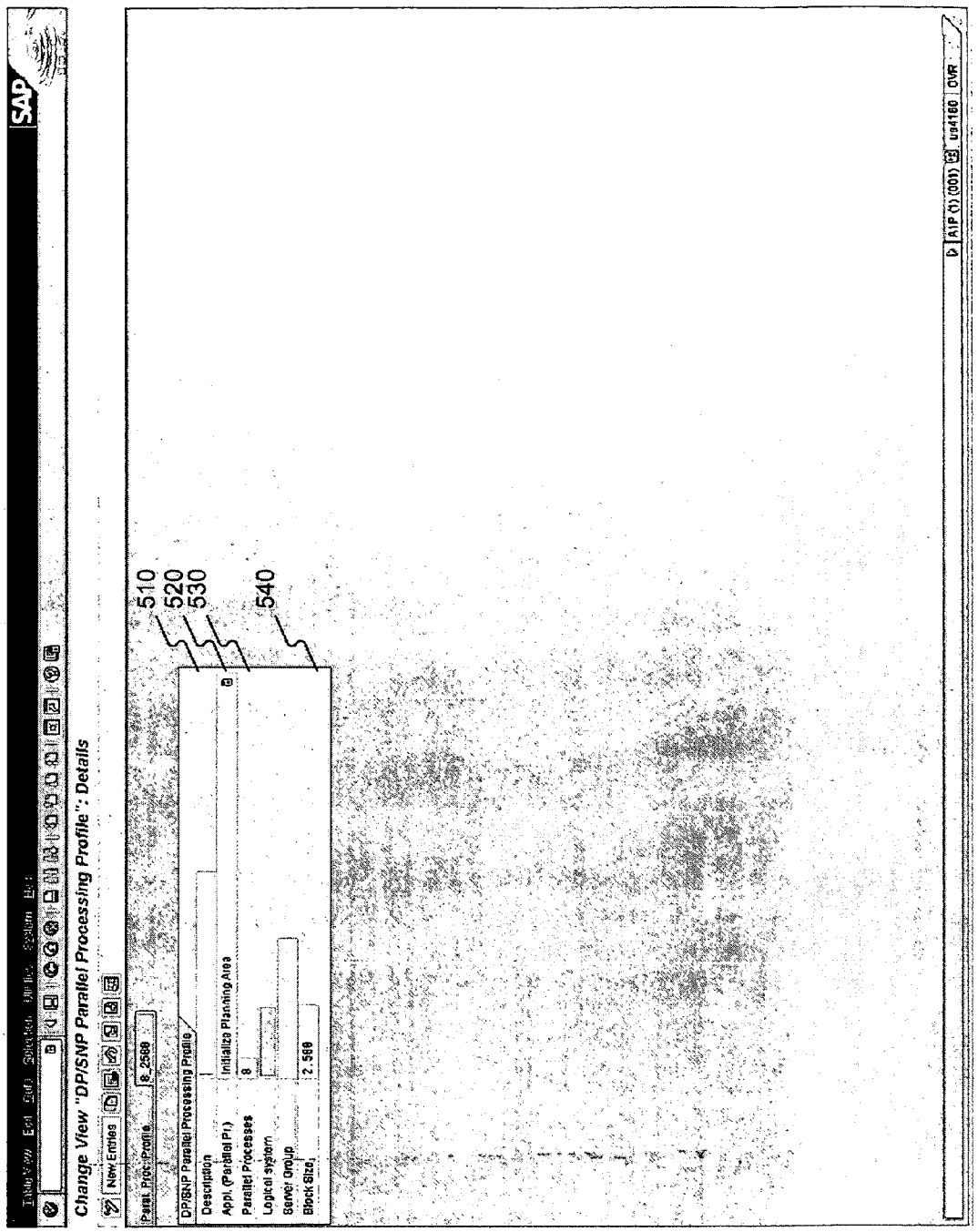
FIG. 5 is an exemplary graphical user interface (GUI) that may be used to define a parallel processing profile.

FIG. 5 is an exemplary GUI used to define a PPP. As described in FIG. 4, the user may designate a profile name (510) and set the application(s) to be associated with the profile (520). The user may also determine the number of parallel processes to be associated with the profile (530) and set the maximum number of transportation lanes to be processed in one process (540).

Figure 6:
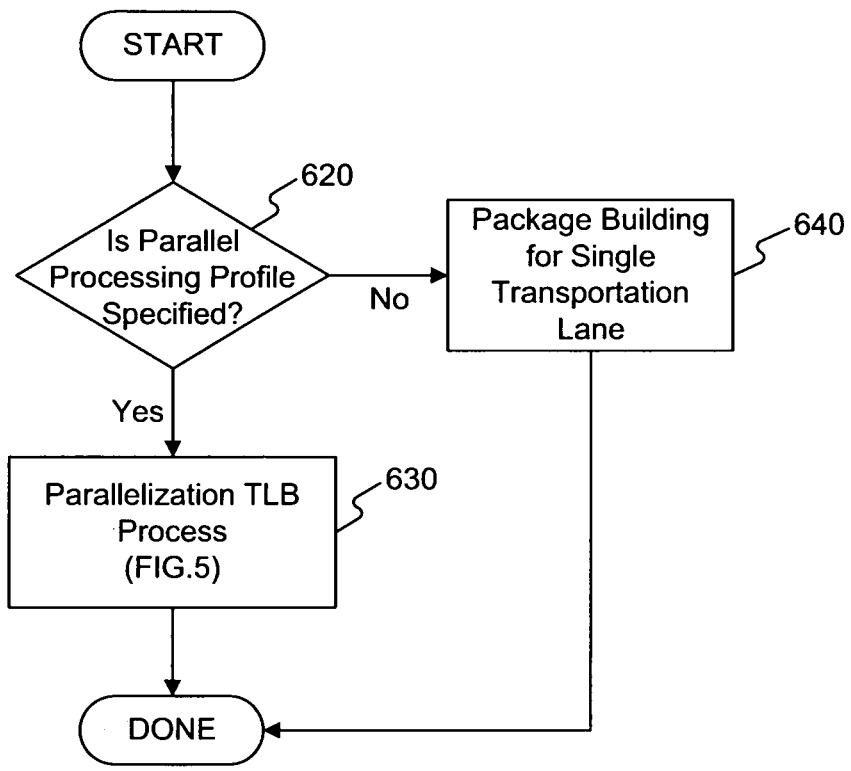
FIG. 6 is a flowchart of an exemplary parallelization TLB process, consistent with an embodiment of the present invention.

FIG. 6 is a flowchart of an exemplary parallelization TLB process, consistent with an embodiment of the present invention. The example of FIG. 6 is described with reference to the exemplary embodiment of SNP system 300 as depicted in FIG. 3. However, other system environments may also be used to implement the exemplary method of FIG. 6.

Referring to FIG. 6, SNP system 300, before grouping a transport load, may first determine whether a PPP was specified by a user of SNP system 300 (stage 620). SNP system 300 may determine whether a profile is specified by determining whether the user has selected a profile name of a previously created profile. If a PPP was specified, SNP system 300 may then execute a parallelization TLB process (stage 630). Exemplary embodiments of a parallelization TLB process are discussed further below with regards to FIGS. 8, 9A-9D, and 10A-10C. If a PPP was not specified, no parallelization is carried out and the selected transportation lanes are processed successively. The SNP system 300 may, therefore, execute a TLB process using a single transportation lane (stage 640).

Figure 7:
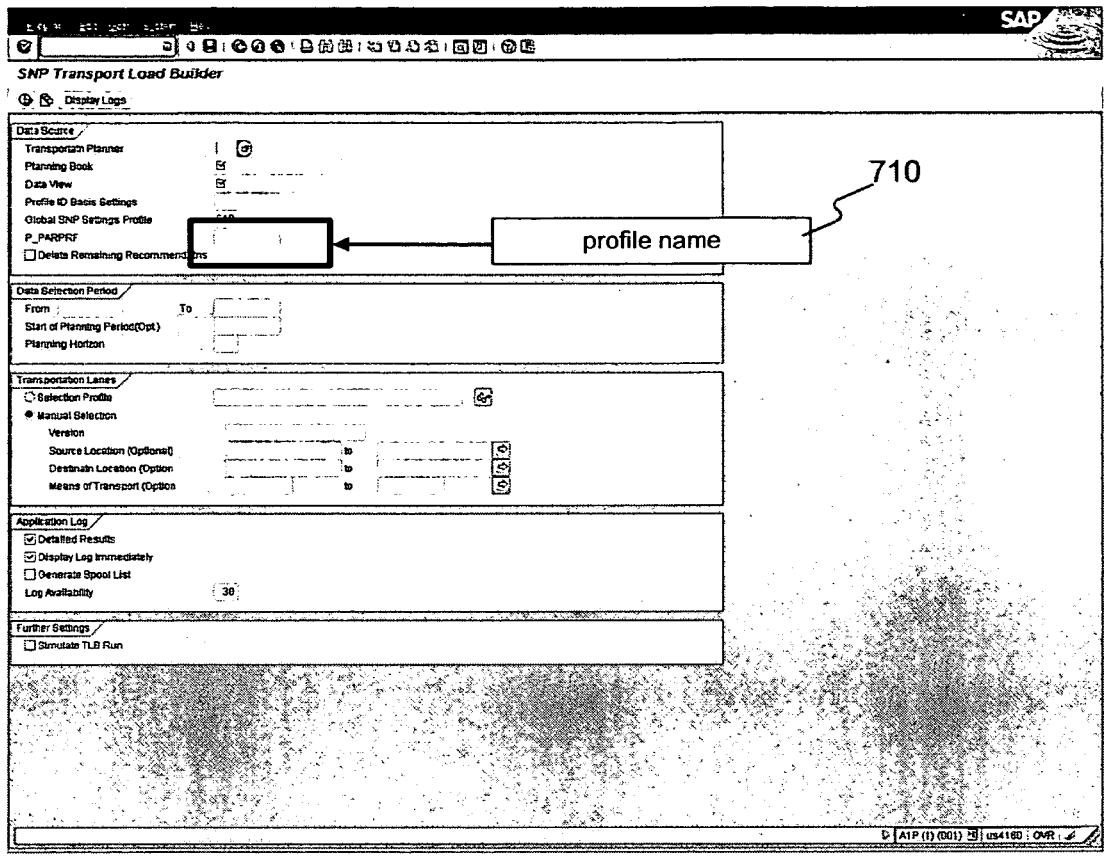
FIG. 7 is an exemplary GUI used to run a parallelization TLB process.

FIG. 7 is an exemplary GUI used to run a parallelization TLB process. To run a parallelization TLB process, one or more user interfaces may be provided. Such an interface may include, for example, entry fields and control buttons for entering information. In one embodiment, a GUI is provided with message prompts, entry fields and/or control buttons to facilitate the running of the parallelization TLB process by a user. Such a GUI may comprise one or more screens or windows to guide a user through the setup of running a parallelization TLB process. Help screens may provide information for the user, and/or drop-down menus or tables may provide lists of predefined services, profiles, or other elements for selection by the user when running a parallelization TLB process. Additionally, or alternatively, a parallelization TLB process may be created using a separate application or program and then stored for later access by the SNP system 300. As shown in FIG. 7, one or more data entry fields may be provided in the GUI to enable a user to specify a PPP. In this case, a PPP may be specified by a user if the user enters a profile name 710. A user may alternatively select a profile name from a pull-down menu.

Figure 8:
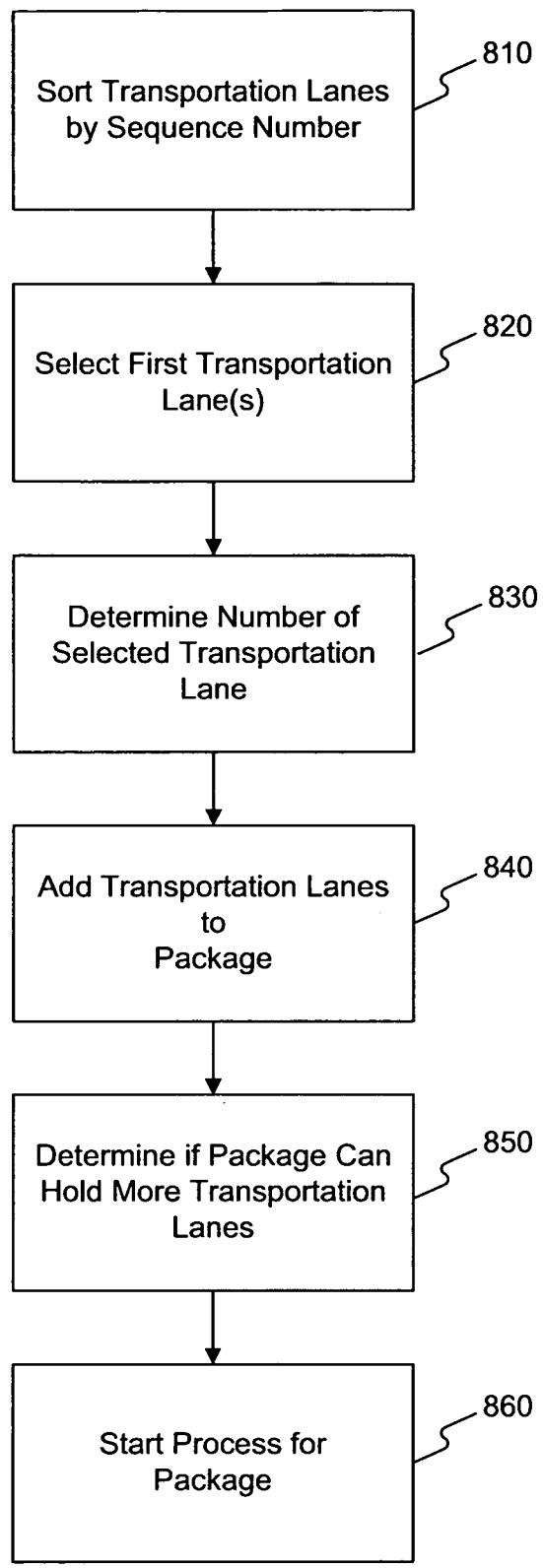
FIG. 8 is a flowchart of an exemplary method for building packages of products for a parallelization TLB process, consistent with an embodiment of the present invention.

FIG. 8 is a flowchart of an exemplary method for building packages of transportation lanes for a parallelization TLB process, consistent with an embodiment of the present invention. As shown in FIG. 8, SNP system 300 may first sort all the transportation lanes by source location and sequence number in a transportation lane table (stage 810). The determination of the sequence number will be discussed further with regard to FIGS. 9A-9C. SNP system 300 may then select the first source location in the transportation lane table (stage 820). After the first source location is selected, SNP system 300 may then determine the number of transportation lane(s) that have a source location matching the selected source location (stage 830). SNP system 300 may then add these transportation lanes to a first package (stage 840) and then determine whether the package can hold any more transportation lanes (stage 850). An exemplary process for determining whether a package can hold any more transportation lanes will be discussed below with regard to FIGS. 10A-10C. SNP system 300 may then start a TLB process for the current package (stage 860). The TLB process may be implemented consistent with conventional techniques or in a manner similar to the TLB process described in U.S. patent application Ser. No. 10/676,401, filed on Oct. 1, 2003, the entire contents of which are expressly incorporated by reference herein.

FIGS. 9A-9D are block diagrams and flowcharts of an exemplary method for determining a sequence number for transportation lanes, consistent with an embodiment of the present invention. The confirmation of a deployment stock transfer and the creation of a TLB shipment is dependent from the available quantity on the source location. The flow of material caused by deployment and TLB in turn affects the result of the availability check and, therefore, the planning sequence of transportation lanes affects the planning result.

Figure 9A:
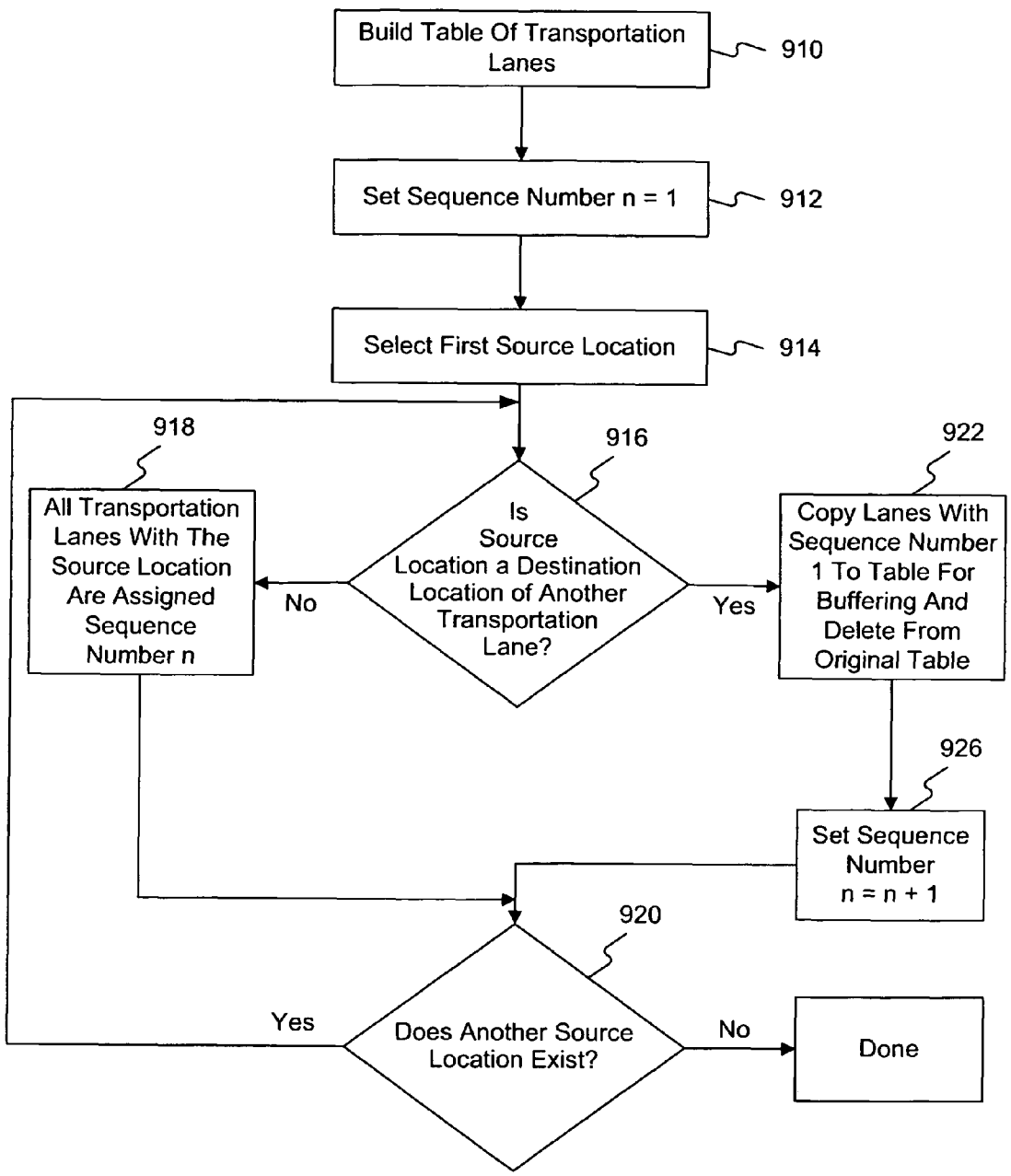
Figure 9B:
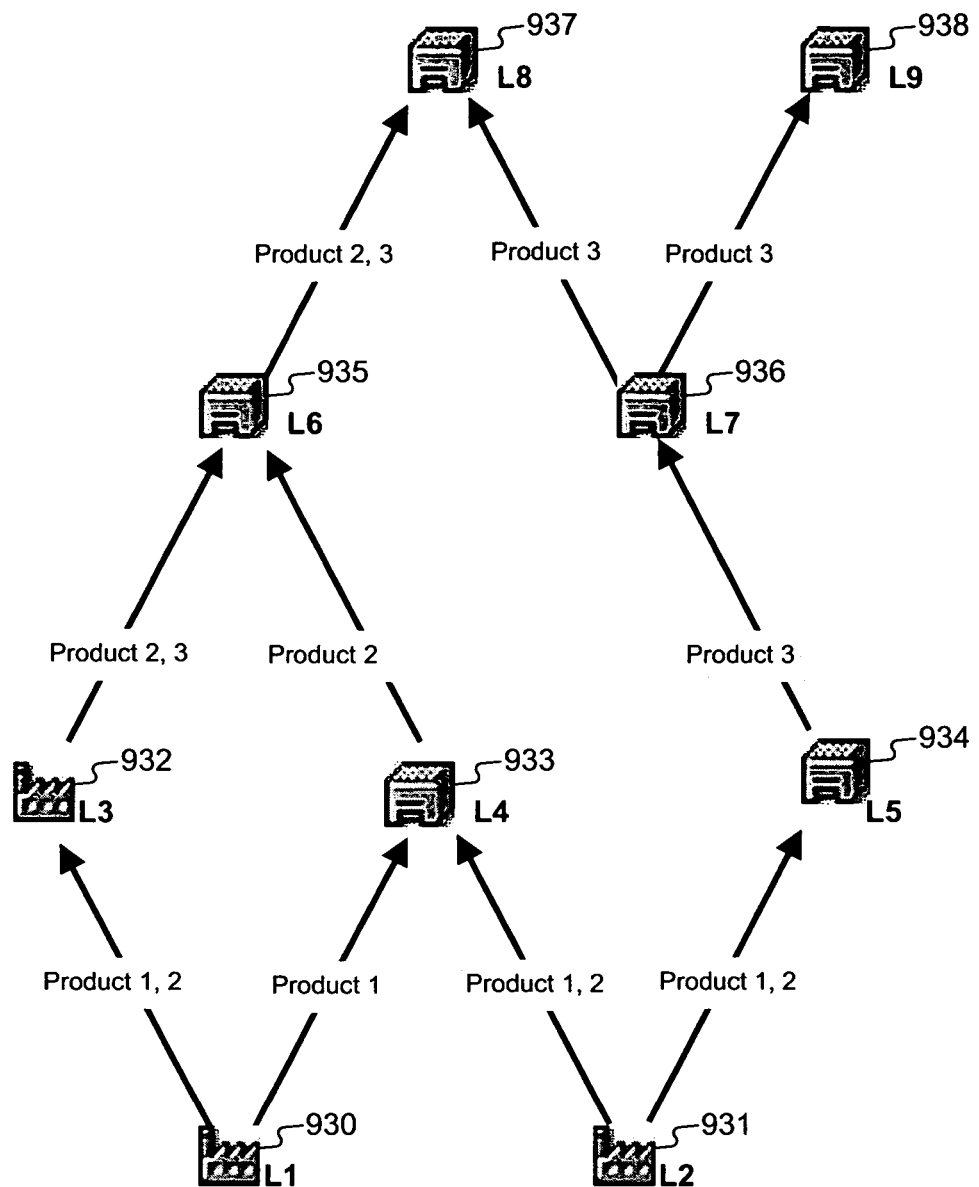

For purposes of describing the exemplary method of FIG. 9A, assume a supply chain exists, such as that depicted in FIG. 9B, consisting of 9 locations ("L1-L9" 931-938) and three products. SNP system 300 may first build a table of transportation lanes as shown in FIG. 9C (stage 910). For the supply chain shown in FIG. 9B, the table may include the transportation lanes "L1->L3" 942, "L1->L4" 944, "L2->L4" 946, etc. Table 940 in FIG. 9C illustrates an exemplary table in which all the lanes of FIG. 9B have been covered.

The sequence number, "n," is initially set to "1" (stage 912). Then SNP system 300 may select the first source location in the lanes table 940, "L1" 930 (stage 914), and determine whether this source location is the destination of any other transportation lanes (stage 916). In this example, "L1" 930 is not the destination of another transportation lane. Therefore, SNP system 300 may assign the sequence number "1" to all the lanes with "L1" as the source location (stage 918). The lanes with "L1" 930 as the source location are "L1->L3" 942 and "L1->L4" 944. Therefore, these two lanes are assigned the sequence number "1" as shown in table 960 in FIG. 9D.

SNP system 300 may then determine whether another source location exists in the lanes table 940 (stage 920). In this example, another source location does exist, "L2" 932. SNP system 300 may then determine whether this source location is the destination of any other transportation lanes in lanes table 940 (stage 916). In this example, "L2" 932 is not the destination of another transportation lane. Therefore, SNP system 300 may then assign the sequence number "1" to all the lanes with "L2" as the source location (stage 918). The lanes with "L2" 932 as the source location are "L2->L4" 946 and "L2->L5" 948." Therefore, these two lanes are assigned the sequence number "1" as shown in FIG. 9D.

SNP system 300 may then determine whether another source location exists in table 940 (stage 920). In this example, the next source location "L3" does exist (stage 920) and SNP system 300 may then determine that "L3" is the destination location of another transportation lane "L1->L3" 942 (stage 916). Therefore, SNP system 300 may copy the transportation lanes with sequence number "1" ("L1->L3" 942, "L1->L4" 944, "L2->L4" 946, and "L2->L5" 948) to a table for buffering and delete these from the original table 940 (stage 922). SNP system 300 may then set the sequence number "n" to be equal to "n+1"; therefore, the sequence number is now set to "2" (stage 926).

SNP system 300 may assign the sequence number "2" to all transportation lanes with "L3" as the source location. Therefore, "L3->L6" 950 is assigned sequence number "2" as shown in table 960. SNP system 300 may then determine another source location "L4" exists (stage 920) and that "L4" is not the destination location of another transportation lane (stage 916) and, therefore, may assign the sequence number "2" to all transportation lanes with "L4" as the source location. Therefore, "L4->L6" 952 is assigned sequence number "2" as shown in table 960 in FIG. 9D (stage 918).

SNP system 300 may then determine whether another source location exists in table 940 (stage 920). In this example, the next source location "L5" does exist (stage 920) and SNP system 300 may then determine that "L5" is not the destination location of another transportation lane in table 940 (stage 916) and, therefore, may assign the sequence number "2" to all transportation lanes with "L5" as the source location. Therefore, "L5->L7" 954 is assigned sequence number "2" as shown in table 960 in FIG. 9D (stage 918).

SNP system 300 may then determine whether another source location exists in the lanes table 940 (stage 920). In this example, another source location does exist, "L6." Therefore, SNP system 300 again will determine whether this source location is the destination location of another transportation lane (stage 916). In this example, "L6" is the destination location of "L3->L6" 950, and, therefore, SNP system 300 may copy the transportation lanes with sequence number n, which is now "2" ("L3->L6" 950, "L4->L6" 952, and "L5->L7" 954) to a table for buffering and delete these from the original table 940 (stage 922). SNP system 300 may then set the sequence number "n," which is now "2," to be equal to "n+1"; therefore, the sequence number is now "3" (stage 926).

SNP system 300 may assign the sequence number "3" to all transportation lanes with "L6" as the source location. Therefore, "L6->L8" 956 is assigned sequence number "3" as shown in table 960 in FIG. 9D.

SNP system 300 may then determine whether another source location exists (stage 920). In this example, the next source location "L7" does exist (stage 920) and SNP system 300 may then determine that "L7" is not the destination location of another transportation lane (stage 916) and, therefore, may assign the sequence number "3" to all transportation lanes with "L7" as the source location. Therefore, "L7->L9" 958 is assigned sequence number "3" as shown in table 960. SNP system 300 may then determine that no more source locations exist (stage 920); therefore, the assignment of sequence numbers is finished.

The lanes table 960 in FIG. 9D may include a list of transportation lanes that TLB uses to group transport loads. The lanes table 960 may include various information about each transportation lane, such as the sequence number of each transportation lane, as well as the source and destination location of each transportation lane. The sequence information may reflect the importance or position of the TLB of the particular transportation lane with regard to the other transportation lanes in the lanes table. For example, in the lanes table of FIG. 9D, the transportation lane "L1->L3" 942 has a sequence number of "1." The lanes table may be sorted by sequence number first and then by the source location of the transportation lanes.

Figure 10A:
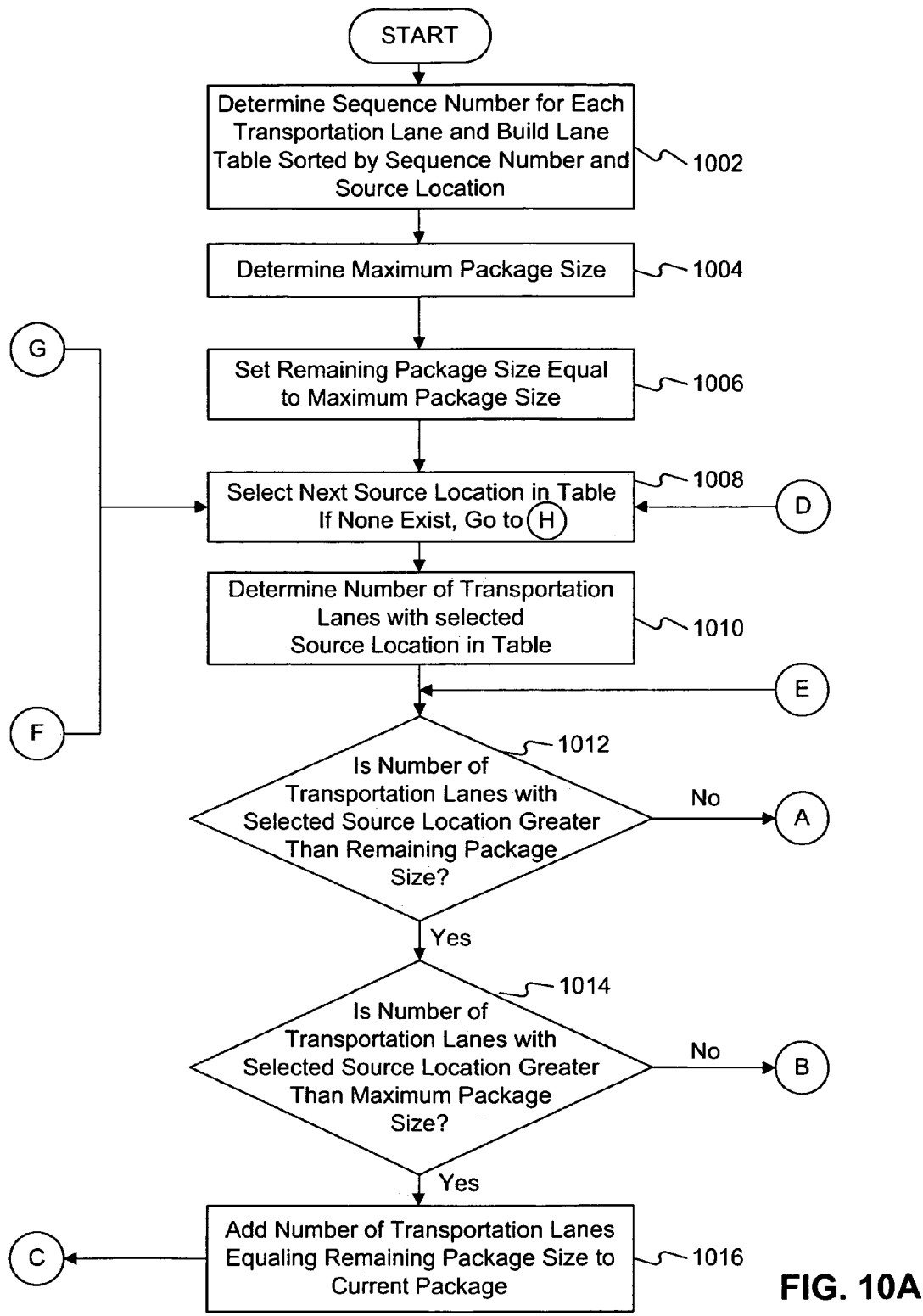
FIGS. 10A-10C are further flowcharts of an exemplary method for building packages of products for a parallelization TLB process, consistent with an embodiment of the present invention.
Figure 10B:
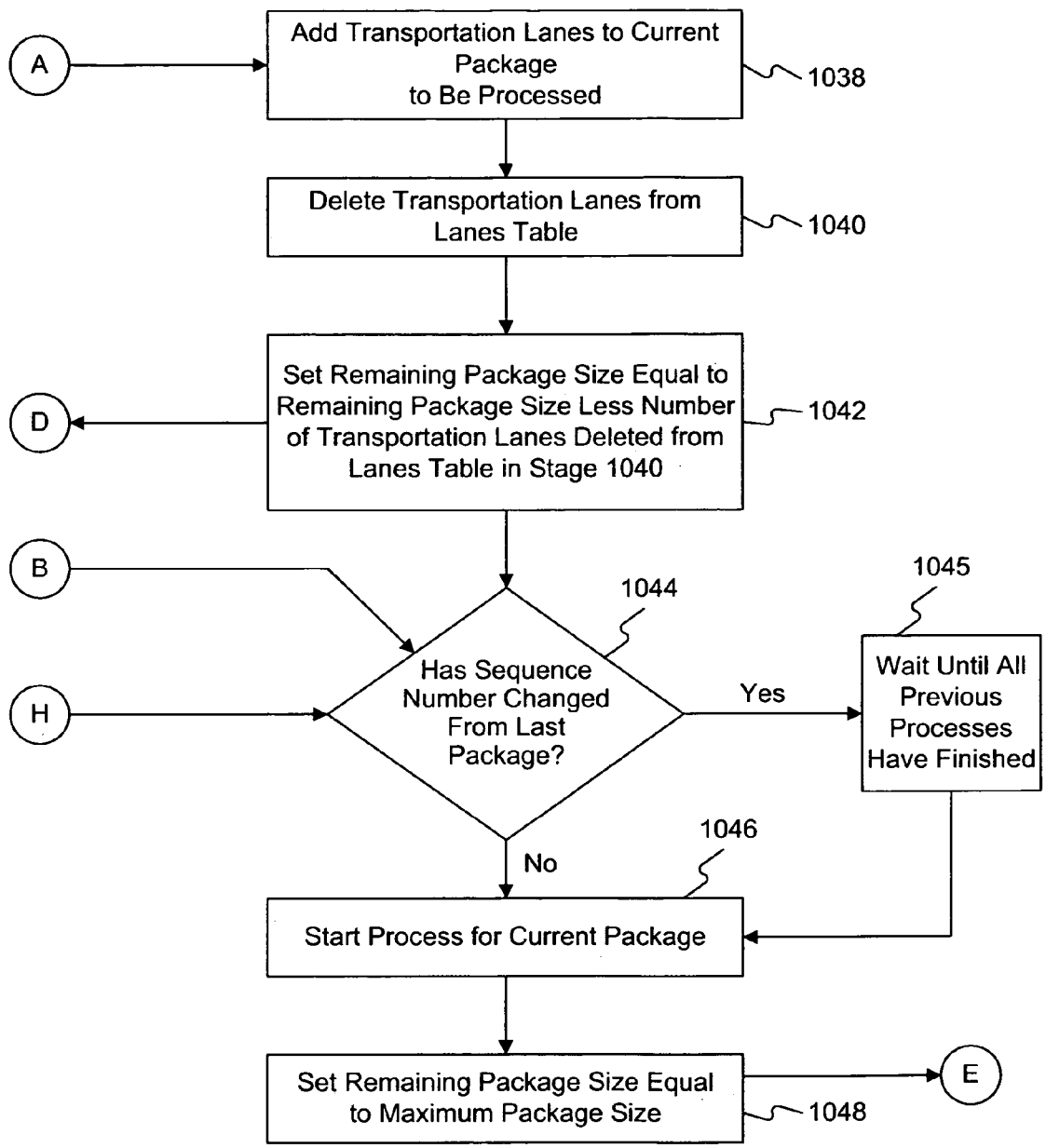
Figure 10C:
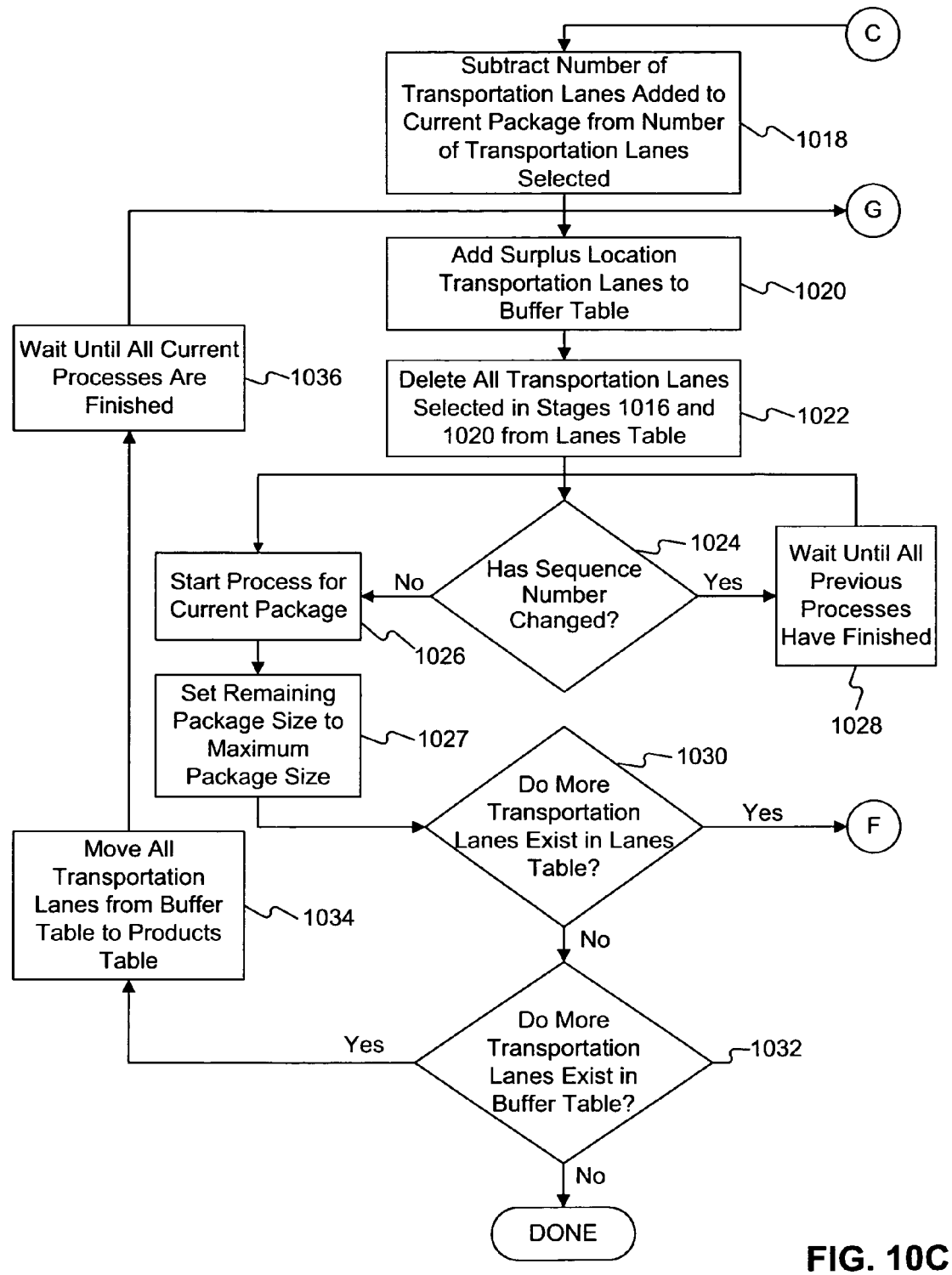

FIGS. 10A-10C are flowcharts of an exemplary method of building packages of transportation lanes for a parallelization TLB process, consistent with an embodiment of the present invention. The package building method is described with reference to specific object types (e.g., transportation lanes). As will be appreciated by those skilled in the art, these exemplary methods may be adapted for other types of objects and/or otherwise modified.

SNP system 300 may first determine a sequence number for each transportation lane (as described in FIGS. 9A-C) and then create a lanes table, where each transportation lane is sorted by the sequence number and source location (as shown in FIG. 9D) (stage 1002).

Once SNP system 300 has built the lanes table, SNP system 300 may determine the maximum package size (stage 1004) from the PPP (e.g., set in stage 430 of FIG. 4). The maximum package size may represent the maximum number of transportation lanes within the lanes table 960 that SNP system 300 may group into one package in order to use the transportation lanes to group transport loads.

After SNP system 300 determines the maximum package size, SNP system 300 may set the remaining package size to be equal to the maximum package size (stage 1006). The remaining package size represents how many additional transportation lanes may be added to the current package. The remaining package size and the maximum package size may at any point in the process of FIGS. 10A-10C be the same number. SNP system 300 may then determine the next source location in a lanes table 960 (stage 1008) and determine the number of occurrences of transportation lanes with the selected source location in the lanes table 960 (stage 1010). For example, SNP system 300 may determine there are two occurrences of the "L1" source location in the lanes table 960. Once SNP system 300 determines the number of occurrences of a transportation lane with this source location, SNP system 300 may determine whether this number is greater than the remaining package size (stage 1012) and, if the number of occurrences is greater, whether this number is also greater than the maximum package size (stage 1014).

If SNP system 300 determines that the number of occurrences of transportation lanes with the selected source location is greater than the maximum package size, SNP system 300 may then add the number of transportation lanes equaling the remaining package size to the current package set for processing (stage 1016) and then subtract the number of transportation lanes added to the current package from the number of transportation lanes selected from the lanes table (stage 1018). The surplus transportation lanes may then be added to a buffer table (stage 1020). By way of example, the buffer table may be located in storage device 316. Once the surplus transportation lanes are added to the buffer table, all of the selected transportation lanes, whether they were added to the current package in stage 1016 or added to the buffer table in stage 1020, are then deleted from the lanes table (stage 1022).

SNP system 300 may then determine whether the sequence number of the transportation lanes in the current package has changed since the start of the last work package (stage 1024). If the sequence number has not changed, SNP system 300 may start a TLB process for the current package of transportation lanes (stage 1026). If the sequence number has changed, SNP system 300 may wait until all of the previous processes have finished (i.e., the TLB run for all of the previous packages has completed) (stage 1028), SNP system 300 may start the process for the current package (stage 1026) and then set the remaining package size to be equal to the maximum package size (stage 1027).

After the process is started for the current package, SNP system 300 may determine whether any more transportation lanes exist in the lanes table (stage 1030). If more transportation lanes exist in the lanes table, SNP system 300 may select the next source location in the table (stage 1008) and continue through stages 1010-1030 until no more source locations exist in the lanes table.

If no more transportation lanes exist in the lanes table, SNP system 300 may determine whether any more source locations exist in the buffer table (stage 1032). If no more transportation lanes exist in the buffer table, SNP system 300 has completed packaging all of the transportation lanes. If more transportation lanes exist in the buffer table, SNP system 300 may then move all of the transportation lanes from the buffer table to the lanes table (stage 1034), wait until all of the current processes have completed, and, therefore, all the TLB runs are finished (stage 1036), and then proceed to the next source location in the lanes table (stage 1008). SNP system 300 may then repeat steps 1010-1032 until no more transportation lanes exist in the lanes and buffer table.

If in stage 1012, SNP system 300 determines that the number of transportation lanes selected from the lanes table is not greater than the remaining package size, SNP system 300 may then add these transportation lanes to the current package to be processed (stage 1038) and delete these added transportation lanes from the lanes table (stage 1040). SNP system 300 may then set the current package size to be equal to the current package size less the number of transportation lanes deleted from the lanes table in stage 1040 (stage 1042). SNP system 300 may then select the next source location in the table (stage 1008) and determine the number of transportation lanes with the selected source location (stage 1010). If the number of transportation lanes is greater than the remaining package size, and SNP system 300 determines that the number of the transportation lanes is not greater than the maximum package size (stage 1014), SNP system 300 may determine whether the sequence number of the transportation lanes has changed from the start of the last package assembly (stage 1044). If it has changed, SNP system 300 may wait until all processes currently started have finished processing (stage 1045) and then start the TLB process for the current package (stage 1046). After the process has been started (stage 1046), SNP system 300 may set the remaining package size to be equal to the maximum package size (stage 1048) and then continue to stage 1012 to determine whether the number of transportation lanes is greater than the remaining package size and continue through steps 1014-1032 until there are no more transportation lanes left in the lanes table.

Figure 11:
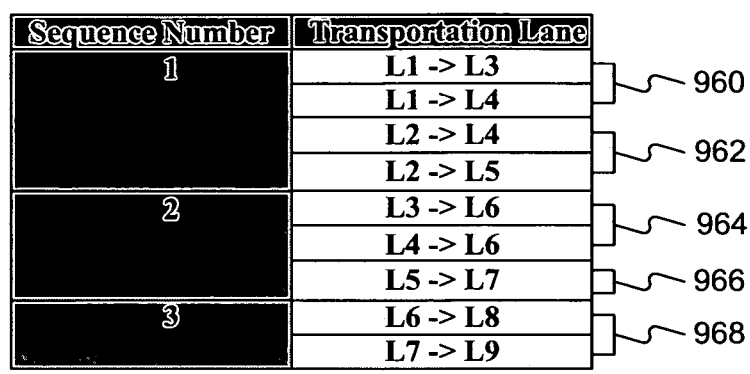
FIG. 11 is an exemplary lanes table, consistent with an embodiment of the present invention.

For purposes of illustration, FIG. 11 provides a diagram of an exemplary lanes table. The exemplary table will be described below with reference to the exemplary method of FIGS. 10A-10C, consistent with an embodiment of the present invention. SNP system 300 may first build a lanes table (see, e.g., FIGS. 6 and 7). The lanes table may include the sequence number of the transportation lane (as determined in FIG. 9A), and the source and destination of the transportation lanes. Transportation lanes with the same sequence number may be processed together. SNP system 300 may then determine the maximum package size from the PPP (see, e.g., stage 1004 in FIG. 10A). For purposes of an example package size, the maximum package size of two ("2") will be used with reference to the lanes table in FIG. 11.

At this point, SNP system 300 may set the remaining package size equal to the maximum package size; therefore, setting the remaining package size to equal "2" (stage 1006). SNP system 300 may then determine the next source location as "L1" 1004 (stage 1008) and that there are two transportation lanes with a source location of "L1", "L1->L3" 942 and "L1->L4" 944 in the lanes table (stage 1010). SNP system 300 may determine the remaining package size is "2" and the number of transportation lanes determined in stage 1010 is "2." Therefore, the number of transportation lanes is not greater than the current remaining package size (stage 1012). SNP system 300 may then add the transportation lanes to the current package to be processed (stage 1038), "package 1" 960. After SNP system 300 adds the transportation lanes to the current package, SNP system 300 may then delete transportation lanes "L1->L3" and "L1->L4" from the table in FIG. 11 (stage 1040). SNP system 300 may set the remaining package size to equal the remaining package size less the number of transportation lanes deleted in stage 1040. As a result, the remaining package size is set to "0" (stage 1042).

SNP system 300 may then determine the next source location in the lanes table 960 as being "L2" (stage 1008). SNP system 300 may then determine there are two transportation lanes with "L2" as a source location, "L2->L4" 946 and "L2->L5" 948. The number of transportation lanes, "2," is greater than the remaining package size "0" (stage 1012), but it is not greater than the maximum package size of "2" (stage 1014). Therefore, SNP system 300 may determine whether the sequence number of the current transportation lanes is different from the previous package (stage 1044). The sequence number of the transportation lanes in "package 1" is "1," and there was no previous package. Therefore, SNP system 300 may start the process for the current package (stage 1046), "package 1" 960. In one embodiment a grouping algorithm is carried out for each transportation lane within the "package 1" 960. The grouping algorithm, as discussed above, may create a transport load using each transportation lane in the current package. The remaining package size may then be set to the maximum package size of "2" (stage 1048).

SNP system 300 may determine whether the number of selected transportation lanes, "2->L4" 946 and "L2->L5" 948, is greater than the remaining package size. In this example, the number of transportation lanes determined in stage 1010 is "2," which is not greater than the remaining package size of "2" (stage 1030). Therefore, SNP system 300 may then add these two lanes to the current package to be processed (stage 1030), "package 2" 962. After SNP system 300 adds the transportation lanes to the current package, SNP system 300 may then delete transportation lanes "2->L4" and "2->L5" from the table in FIG. 11 (stage 1040). SNP system 300 may set the remaining package size to equal the remaining package size less the number of transportation lanes deleted in stage 1040. As a result, the remaining package size is set to "0" (stage 1042).

SNP system 300 may then determine the next source location in the lanes table 960 as being "L3" (stage 1008). SNP system 300 may determine there is one transportation lanes with "L3" as a source location, "L3->L6" 950. The number of transportation lane, "1," is greater than the remaining package size "0" (stage 1012), but it is not greater than the maximum package size of "2" (stage 1014). Therefore, SNP system 300 may determine whether the sequence number of the current package is different from the previous package (stage 1044). The sequence number of the transportation lanes in "package 2" 962 ("2->L4" and "2->L5"") is "1," and the sequence numbers of the previous package, "package 1" was also "1." Therefore, SNP system 300 may start the process for the current package (stage 1046), "package 2". A grouping algorithm is carried out using each transportation lane within the "package 1" 962. The grouping algorithm, as discussed above, may create a transport load for using the transportation lane(s) in the current package. The remaining package size may then be set to the maximum package size of "2" (stage 1048).

SNP system 300 may determine whether the number of selected transportation lanes, "L3->L6" 950, is greater than the remaining package size. In this example, the number of transportation lanes determined in stage 1010 is "1," which is not greater than the remaining package size of "2" (stage 1030). Therefore, SNP system 300 may add this transportation lane to the current package to be processed (stage 1030), "package 3" 964. After SNP system 300 adds the transportation lane to the current package, SNP system 300 may then delete transportation lane "L3->L6" from the table in FIG. 11 (stage 1040). SNP system 300 may set the remaining package size to equal the remaining package size less the number of transportation lanes deleted in stage 1040. As a result, the remaining package size is set to "1" (stage 1042).

SNP system 300 may then determine the next source location in the lanes table 940 as being "L4" (stage 1008). SNP system 300 may then determine there is 1 transportation lanes with "L4" as a source location, "L4->L6" 952. The number of transportation lanes, "1," is not greater than the remaining package size "1." Therefore, SNP system 300 may then add this transportation lane to the current package to be processed (stage 1030), "package 3" 964. After SNP system 300 adds the transportation lanes to the current package, SNP system 300 may then delete transportation lane "L4->L6" from the table in FIG. 11 (stage 1040). SNP system 300 may set the remaining package size to equal the remaining package size less the number of transportation lanes deleted in stage 1040. As a result, the remaining package size is set to "0" (stage 1042).

SNP system 300 may then determine the next source location in the lanes table 960 as being "L5" (stage 1008). SNP system 300 may then determine there is one transportation lane with "L5" as a source location, "L5->L7" 954. The number of transportation lanes, "1," is greater than the remaining package size "0" (stage 1012), but it is not greater than the maximum package size of "2" (stage 1014). Therefore, SNP system 300 may determine whether the sequence number of the current package is different from the previous package (stage 1044). The sequence number of the transportation lanes in "package 3" 964 ("L3->L6" and "L4->L6") is "2," and the sequence number of the previous package, "package 2" 962, was "1." Therefore, SNP system 300 may then wait until all previous packages have finished processing ("package 1" 960 and "package 2" 962) (stage 1045), and then start the process for the current package, "package 3" 964. Consistent with one embodiment, a grouping algorithm may be carried out using each transportation lane within the "package 3" 964. The remaining package size may then be set to the maximum package size of "2" (stage 1048).

SNP system 300 may determine whether the number of selected transportation lanes, "L5->L7" 954, is greater than the remaining package size. In this example, the number of transportation lanes determined in stage 1010 is "1," which is not greater than the remaining package size of "2" (stage 1030). Therefore SNP system 300 may then add this transportation lane to the current package to be processed (stage 1030), "package 4" 966. After SNP system 300 adds the transportation lanes to the current package, SNP system 300 may then delete transportation lane "L5->L7" from the table in FIG. 11 (stage 1040). SNP system 300 may set the remaining package size to equal the remaining package size less the number of transportation lanes deleted in stage 1040. As a result, the remaining package size is set to "0" (stage 1042).

SNP system 300 may then determine the next source location in the lanes table 960 as being "L6" (stage 1008). SNP system 300 may determine there is one transportation lanes with "L6" as a source location, "L6->L8" 956. The number of transportation lane, "1," is greater than the remaining package size "0" (stage 1012), but it is not greater than the maximum package size of "2" (stage 1014). Therefore, SNP system 300 may determine whether the sequence number of the current package is different from the previous package (stage 1044). The sequence number of the transportation lanes in "package 4" 966 ("L5->L7") was "2," and the sequence number of the previous package, "package 3" 964, was also "2." Therefore, SNP system 300 may then start the process for the current package, "package 4" 966. A grouping algorithm is carried out using each transportation lane within the "package 4" 966. The remaining package size may then be set to the maximum package size of "2" (stage 1048).

SNP system 300 may determine whether the number of selected transportation lanes, "L6->L8" 956, is greater than the remaining package size. In this example, the number of transportation lanes determined in stage 1010 is "1," which is not greater than the remaining package size of "2" (stage 1030). Therefore, SNP system 300 may add this transportation lane to the current package to be processed (stage 1030), "package 5" 968. After SNP system 300 adds the transportation lanes to the current package, SNP system 300 may then delete transportation lane "L6->L8" from the table in FIG. 11 (stage 1040). SNP system 300 may set the remaining package size to equal the remaining package size less the number of transportation lanes deleted in stage 1040. As a result, the remaining package size is set to "1" (stage 1042).

SNP system 300 may then determine the next source location in the lanes table 960 as being "L7" (stage 1008). SNP system 300 may then determine there is one transportation lane with "L7" as a source location, "L7->L9" 958. The number of transportation lanes, "1," is not greater than the remaining package size "1." Therefore, SNP system 300 may add this transportation lane to the current package to be processed (stage 1030), "package 5" 968. After SNP system 300 adds the transportation lanes to the current package, SNP system 300 may delete transportation lane "L7->L9" from the table in FIG. 11 (stage 1040). SNP system 300 may set the remaining package size to equal the remaining package size less the number of transportation lanes deleted in stage 1040. As a result, the remaining package size is set to "0" (stage 1042).

Since there are no more transportation lanes in the lanes table, SNP system 300 may determine whether the sequence number of the current package is different from the previous package (stage 1044). The sequence number of the transportation lanes in "package 5" 968 ("L6->L8" and "L7->L9"") is "3," and the sequence number of the previous package, "package 4" 966 was "2." Therefore, SNP system 300 may then wait until all previous packages have finished processing ("package 3" 964 and "package 4" 966) (stage 1045), and then start the process for the current package, "package 5" 968. A grouping algorithm is carried out using each transportation lane within the "package 5" 968. All transportation lanes have now been processed.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed:

1. A computer-implemented method for creating a transport load for one or more transfers of goods within a supply chain, the method comprising:

accessing a parallel processing profile associated with a distribution plan of the supply chain, the distribution plan comprising a plurality of transport load processes executed in parallel, and the parallel processing profile specifying a maximum number of transportation lanes for the transport load processes;

generating, using a processor, lane data associated with transportation lanes of the supply chain, wherein the generating step comprises:
  preparing a lanes table for a plurality of transportation lanes, the transportation lanes representing geographic routes between source locations and corresponding destination locations within the supply chain, the lanes table comprising the source locations, the destination locations, and sequence numbers that prioritize the plurality of transportation lanes;
  receiving, from a planning computer, a source location within the supply chain;
  selecting, from the lanes table, one or more of the transportation lanes for the lane data based on at least the received source location;
  filtering the selected transportation lanes based on at least the maximum number of transportation lanes specified by the parallel processing profile; and
  storing, in a storage medium, source locations, destination locations, and sequence numbers of the filtered transportation lanes to generate the lane data; and
generating, using the processor, the transport loads based on the lane data associated with the selected transportation lanes by executing the transport load processes in parallel according to the parallel processing profile associated with the distribution plan.

2. The method of claim 1, further comprising:
defining the parallel processing profile associated with the distribution plan, wherein defining the parallel processing profile comprises:
  defining a profile name to be associated with the profile;
  setting a transport load application to be associated with the profile;
  setting a maximum number of the transport load processes to be associated with the transport load application; and
  setting the maximum number of transportation lanes to be grouped in the lane data.

3. The method of claim 2, further comprising:
determining whether the parallel processing profile is defined prior to generating the transport loads, wherein the determining comprises:
  determining whether the profile name is specified by a user of the application.

4. The method of claim 2, wherein the step of generating the lane data further comprises:
  setting a remaining number of transportation lanes equal to the maximum number of transportation lanes specified by the parallel processing profile.

5. The method of claim 4, wherein the step of generating the lane data further comprises:
  determining whether the selected transportation lanes exceed the remaining number of transportation lanes.

6. The method of claim 5, wherein the filtering step comprises:
  adding the selected transportation lanes to the lane data when the selected transportation lanes do not exceed the remaining number of transportation lanes;
  deleting the selected transportation lanes from the lanes table; and
  setting the remaining number of transportation lanes to equal the remaining number of transportation lanes less the number of selected transportation lanes added to the lane data.

7. The method of claim 5, wherein the filtering comprises:
  adding the selected transportation lanes to the lane data when the selected transportation lanes exceed the remaining number of transportation lanes, and when the selected transportation lanes do not exceed the maximum number of transportation lanes; and
  setting the remaining number of transportation lanes equal to the maximum number of transportation lanes.

8. The method of claim 5, wherein the filtering comprises:
  adding a number of the selected transportation lanes equaling the remaining number of transportation lanes to the lane data when the selected transportation lanes exceed the remaining number of transportation lanes and the maximum number of transportation lanes;
  determining a surplus of transportation lanes, wherein the surplus comprises a number of the selected transportation lanes that exceed the remaining number of transportation lanes;
  adding the surplus of transportation lanes to a buffer table; and
  deleting the selected transportation lanes from the lanes table.

9. The method of claim 8, further comprising:
  determining whether the sequence number of the selected transportation lanes has changed.

10. The method of claim 9, further comprising:
  starting a distribution plan process for the transport loads if the sequence number has not changed; and
  setting the remaining number of transportation lanes to the maximum number of transportation lanes.

11. The method of claim 10, further comprising:
  determining whether the lanes table includes an additional source location; and
  moving the transportation lanes from the buffer table to the lanes table based on the determination of whether the lanes table includes the additional source location.

12. The method of claim 11, further comprising:
  selecting the additional source location in the lanes table when the distribution process for the transport loads is completed.

13. The method of claim 1, further comprising:
  determining the sequence numbers for the selected transportation lanes.

14. The method of claim 13, wherein the step of determining the sequence numbers for the selected transportation lanes comprises:
  assigning a value of one to a current sequence number of the selected transportation lanes;
  building a second lanes table, wherein the second lanes table identifies the source location and destination location of the plurality of transportation lanes of the supply chain;
  identifying one or more transportation lanes from the second lanes table associated with a source location which is not a destination location of another transportation lane;
  assigning the current sequence number to the identified transportation lanes;
  removing the identified transportation lanes from the second lanes table; and
  increasing the value of the current sequence number by one.

15. The method of claim 14, wherein the step of assigning the current sequence number to the identified transportation lanes comprises:
  assigning the identified transportation lanes the current sequence number until no more transportation lanes exist in the second lanes table.

16. A distribution system for creating a transport load for one or more transfers of goods in a supply chain, the system comprising:
- a processor; and
- a memory,
- wherein the processor and the memory are configured to perform a method comprising:
  - accessing a parallel processing profile associated with a distribution plan of the supply chain, the distribution plan comprising a plurality of transport load processes executed in parallel, and the parallel processing profile specifying a maximum number of transportation lanes for the transport load processes;
  - generating lane data associated with transportation lanes of the supply chain, wherein the generating step comprises:
    - preparing a lanes table for a plurality of transportation lanes, the transportation lanes representing geographic routes between source locations and corresponding destination locations within the supply chain, the lanes table comprising the source locations, the destination locations, and sequence numbers that prioritize the plurality of transportation lanes;
    - receiving, from a planning computer, a source location within the supply chain;
    - selecting, from the lanes table, one or more of the transportation lanes for the lane data based on at least the received source location;
    - filtering the selected transportation lanes based on at least the maximum number of transportation lanes specified by the parallel processing profile; and
    - storing, in a storage medium, source locations, destination locations, and sequence numbers of the filtered transportation lanes to generate the lane data; and
  - generating transport loads based on the lane data associated with the selected transportation lanes by executing the transport load processes in parallel according to the parallel processing profile associated with the distribution plan.

17. The distribution system according to claim 16, the method further comprising:
defining the parallel processing profile associated with the distribution plan, wherein defining the parallel processing profile comprises:
- defining a profile name to be associated with the profile;
- setting a transport load application to be associated with the profile;
- setting a maximum number of the transport load processes to be associated with the transport load application; and
- setting the maximum number of transportation lanes to be grouped in the lane data.

18. The distribution system according to claim 17, the method further comprising:
determining whether the parallel processing profile is defined prior to generating the transport loads, wherein the determining comprises:
- determining whether the profile name is specified by a user of the application.

19. The distribution system according to claim 17, wherein the step of generating the lane data further comprises:
setting a remaining number of transportation lanes of the lane data equal to the maximum number of transportation lanes specified by the parallel processing profile.

20. The distribution system according to claim 19, the step of generating the lane data further comprises:
determining whether the selected transportation lanes exceed the remaining number of transportation lanes.

21. The distribution system according to claim 20, wherein the filtering comprises:
- adding the selected transportation lanes to the lane data when the selected transportation lanes do not exceed the remaining number of transportation lanes;
- deleting the selected transportation lanes from the lanes table; and
- setting the remaining number of transportation lanes to equal the remaining number of transportation lanes less the number of selected transportation lanes added to the lane data.

22. The distribution system according to claim 20, wherein the filtering step further comprises:
- adding the selected transportation lanes to the lane data when the selected transportation lanes exceed the remaining number of transportation lanes, and when the selected transportation lanes do not exceed the maximum number of transportation lanes; and
- setting the remaining number of transportation lanes equal to the maximum number of transportation lanes.

23. The distribution system according to claim 20, wherein the filtering comprises:
- adding a number of the selected transportation lanes equaling the remaining number of transportation lanes to the lane data when the selected transportation lanes exceed the remaining number of transportation lanes and the maximum number of transportation lanes;
- determining a surplus of transportation lanes, wherein the surplus comprises a number of the selected transportation lanes that exceed the remaining number of transportation lanes;
- adding the surplus of transportation lanes to a buffer table; and
- deleting the selected transportation lanes from the lanes table.

24. The distribution system according to claim 23, the method further comprising:
determining whether the sequence number of the selected transportation lanes has changed.

25. The distribution system according to claim 24, the method further comprising:
- starting a distribution plan process for the transport loads if the sequence number has not changed; and
- setting the remaining number of transportation lanes to the maximum number of transportation lanes.

26. The distribution system according to claim 25, the method further comprising:
- determining whether the lanes table includes an additional source location; and
- moving the transportation lanes from the buffer table to the lanes table based on the determination of whether the lanes table includes the additional source location.

27. The distribution system according to claim 26, the method further comprising:
selecting the additional source location in the lanes table when the distribution process for the transport loads is completed.

28. The distribution system according to claim 16, the method further comprising:
determining the sequence numbers for the selected transportation lanes.

29. The distribution system according to claim 28, wherein the step of determining the sequence numbers for the selected transportation lanes comprises:
- assigning a value of one to a current sequence number of the selected transportation lanes;
- building a second lanes table, wherein the second lanes table identifies the source location and destination location of the plurality of transportation lanes of the supply chain;
- identifying one or more transportation lanes from the second lanes table associated with a source location which is not a destination location of another transportation lane;
- assigning the current sequence number to the identified transportation lanes;
- removing the identified transportation lanes from the second lanes table; and
- increasing the value of the current sequence number by one.

30. The distribution system according to claim 29, wherein the step of assigning the current sequence number to the identified transportation lanes comprises:
- assigning the identified transportation lanes the current sequence number until no more transportation lanes exist in the second lanes table.

31. A tangible, non-transitory computer-readable medium containing a set of instructions which, when executed, perform a method for creating a transport load for one or more stock transfers of goods in a supply chain, the method comprising:
- accessing a parallel processing profile associated with a distribution plan of the supply chain, the distribution plan comprising a plurality of transport load processes executed in parallel, and the parallel processing profile specifying a maximum number of transportation lanes for the transport load processes;
- generating, using a processor, lane data associated with transportation lanes of the supply chain, wherein the generating step comprises:
    - preparing a lanes table for a plurality of transportation lanes, the transportation lanes representing geographic routes between source locations and corresponding destination locations within the supply chain, the lanes table comprising the source locations, the destination locations, and sequence numbers that prioritize the plurality of transportation lanes;
    - receiving, from a planning computer, a source location within the supply chain;
    - selecting, from the lanes table, one or more of the transportation lanes for the lane data based on at least the received source location;
    - filtering the selected transportation lanes based on at least the maximum number of transportation lanes specified by the parallel processing profile; and
    - storing, in a storage medium, source locations, destination locations, and sequence numbers of the filtered transportation lanes to generate the lane data; and
- generating, using the processor, transport loads based on the lane data associated with the selected transportation lanes by executing the transport load processes in parallel according to the parallel processing profile associated with the distribution plan.

32. The tangible, non-transitory computer-readable medium of claim 31, further comprising:
- defining the parallel processing profile associated with the distribution plan, wherein defining the parallel processing profile comprises:
    - defining a profile name to be associated with the profile;
    - setting a transport load application to be associated with the profile;
    - setting a maximum number of the transport load processes to be associated with the transport load application; and
    - setting the maximum number of transportation lanes to be grouped in the lane data.

33. The tangible, non-transitory computer-readable medium of claim 32, further comprising:
- determining whether the parallel processing profile is defined prior to generating the transport loads, wherein the determining comprises:
    - determining whether the profile name is specified by a user of the application.

34. The tangible, non-transitory computer-readable medium of claim 32, wherein the step of generating the lane data further comprises:
- setting a remaining number of transportation lanes of the lane data equal to the maximum number of transportation lanes specified in the parallel processing profile.

35. The tangible, non-transitory computer-readable medium of claim 34, wherein the step of generating the lane data further comprises:
- determining whether the selected transportation lanes exceed the remaining number of transportation lanes.

36. The tangible, non-transitory computer-readable medium of claim 35, wherein the filtering step comprises:
- adding the selected transportation lanes to the lane data when the selected transportation lanes do not exceed the remaining number of transportation lanes;
- deleting the selected transportation lanes from the lanes table; and
- setting the remaining number of transportation lanes to equal the remaining number of transportation lanes less the number of selected transportation lanes added to the lane data.

37. The tangible, non-transitory computer-readable medium of claim 35, wherein the filtering step comprises:
- adding the selected transportation lanes to the lane data when the selected transportation lanes exceed the remaining number of transportation lanes, and when the selected transportation lanes do not exceed the maximum number of transportation lanes; and
- setting the remaining number of transportation lanes equal to the maximum number of transportation lanes.

38. The tangible, non-transitory computer-readable medium of claim 35, wherein the filtering comprises:
- adding a number of the selected transportation lanes equaling the remaining number of transportation lanes to the lane data when the selected transportation exceed the remaining number of transportation lanes and the maximum number of transportation lanes;
- determining a surplus of transportation lanes, wherein the surplus comprises a number of the selected transportation lanes that exceed the remaining number of transportation lanes;
- adding the surplus of transportation lanes to a buffer table; and
- deleting the selected transportation lanes from the lanes table.

39. The tangible, non-transitory computer-readable medium of claim 38, further comprising:
- determining whether the sequence number of the selected transportation lanes has changed.

40. The tangible, non-transitory computer-readable medium of claim 39, further comprising:

starting a distribution plan process for the transport loads if the sequence number has not changed; and setting the remaining number of transportation lanes to the maximum number of transportation lanes.

41. The tangible, non-transitory computer-readable medium of claim 40, further comprising:

determining whether the lanes table includes an additional source location; and moving the transportation lanes from the buffer table to the lanes table based on the determination of whether the lanes table includes the additional source location.

42. The tangible, non-transitory computer-readable medium of claim 41, further comprising:

selecting the additional source location in the lanes table when the distribution process for the transport loads is completed.

43. The tangible, non-transitory computer-readable medium of claim 31, further comprising:

determining the sequence numbers for the selected transportation lanes.

44. The tangible, non-transitory computer-readable medium of claim 43, wherein determining the sequence number for each transportation lane further comprises:

assigning a value of one to a current sequence number of the selected transportation lanes;

building a second lanes table, wherein the second lanes table identifies the source location and destination location of the plurality of transportation lanes of the supply chain;

identifying one or more transportation lanes from the second lanes table associated with a source location which is not a destination location of another transportation lane;

assigning the current sequence number to the identified transportation lanes;

removing the identified transportation lanes from the second lanes table; and increasing the value of the current sequence number by one.

45. The tangible, non-transitory computer-readable medium of claim 44, wherein the step of assigning the current sequence number to the identified transportation lanes comprises:

assigning the identified transportation lanes the current sequence number until no more transportation lanes exist in the second lanes table.

* * * * *